United States Patent [19]
Hirata et al.

[11] Patent Number: 5,965,654
[45] Date of Patent: Oct. 12, 1999

[54] POLYOLEFIN-BASED PLASTIC COMPOSITION AND AUTOMOTIVE MOLDED ARTICLE FORMED THEREOF

[75] Inventors: Tomio Hirata, Eaton, Ohio; Kazuo Matsuyama, Shizuoka, Japan; Kazuyuki Yamamoto, Shizuoka, Japan; Kazushige Ohnishi, Shizuoka, Japan; Yukihito Zanka, Mie, Japan; Takuya Kurio, Mie, Japan; Takashi Niimi, Mie, Japan; Satoru Ichikawa, Kanagawa, Japan; Motoru Komatsu, Kanagawa, Japan; Masahiro Terada, Kanagawa, Japan; Hirosuke Kamae, Kanagawa, Japan; Akira Kawai, Kanagawa, Japan

[73] Assignees: Nissan Motor Co., Ltd, Yokohama; Nihon Plast Co., Ltd., Fuju; Japan Polychem Corporation, Tokyo, all of Japan

[21] Appl. No.: 08/838,986

[22] Filed: Apr. 23, 1997

[30]      Foreign Application Priority Data

Apr. 26, 1996  [JP]  Japan ..................................... 8-107042

[51] Int. Cl.$^6$ ...................................................... C08K 3/00
[52] U.S. Cl. ............................................ 524/451; 525/240
[58] Field of Search .............................. 524/451; 525/240

[56]            References Cited

U.S. PATENT DOCUMENTS

| | | | |
|---|---|---|---|
| 5,308,908 | 5/1994 | Fukui et al. .............................. | 524/451 |
| 5,391,618 | 2/1995 | Yamamoto et al. ....................... | 525/88 |
| 5,599,865 | 2/1997 | Koizumi et al. ......................... | 524/413 |

FOREIGN PATENT DOCUMENTS

| | | |
|---|---|---|
| 0695781 | 2/1996 | European Pat. Off. . |
| 695781 | 2/1996 | European Pat. Off. . |
| 44 06 532 A1 | 9/1994 | Germany . |
| 456649 | 2/1992 | Japan . |
| 181417 | 8/1994 | Japan . |
| 91/04257 | 4/1991 | WIPO . |

OTHER PUBLICATIONS

"Handbook of Fillers for Plastics", ed. Katz and Milewski, pp. 222–231 (1987).

Japanese Industrial Standard, K–7210, "Testing Method for Melt Flow rate of Thermoplastics" pp.: 453–457, with English translation.

Japanese Industrial Standard, K–7203, "Testing Method for Flexural Properties of Rigid Plastic" pp.: 310–314, with English translation.

Japanese Industrial Standard, K–6758, "Testing Methods for Polypropylenes", pp.: 776–777, with English translation.

Japanese Industrial Standard, K–7110, "Method of Izod Impact Test for Rigid Plastics", pp.: 225–236, with English translation.

Japanese Industrial Standard, K–5400, "Testing Methods for Paints", pp.: 279–286, with English translation.

WPI Accession No. 96–378960 [38], & JP08183412, with abstract.

WPI Accession No. 93–164637 [20], & JP05098094, with abstract.

Derwent Report No. 96–378960/38 of JP 08–138412 (Jul. 16, 1996).

*Primary Examiner*—Edward J. Cain
*Attorney, Agent, or Firm*—Foley & Lardner

[57]            ABSTRACT

A polyolefin-based plastic composition suitable for an automotive molded pillar member such as a pillar garnish. The plastic composition comprises (A) block copolymer in an amount ranging from 53 to 68 parts by weight, the block copolymer having a Melt Flow Rate (at 230° C. and under 2.16 kg) ranging from 20 to 50 g/10 min. and containing crystalline polypropylene section in an amount ranging from 90 to 95% by weight, having a density of not lower than 0.908 g/cm$^3$, and propylene-ethylene random copolymer section in an amount ranging from 5 to 10% by weight, the propylene-ethylene random copolymer section having an ethylene content ranging from 35 to 45% by weight; (B) ethylene-1-butene copolymer rubber in an amount ranging from 12 to 20 parts by weight and having a density ranging from 0.85 to 0.87 g/cm$^3$ and a Melt Flow Rate (at 230° C. and under 2.16 kg) ranging from 0.2 to 5 g/10 min., the copolymer rubber containing 1-butene in an amount ranging from 30 to 40% by weight; and (C) talc in an amount ranging from 22 to 30 parts by weight and having a length not more than 15 μm and an average particle size ranging from 1.5 to 6 μm, the talc having an average aspect ratio not lower than 5. The polyolefin-based plastic composition has a Melt Flow Rate (at 230° C. and under 2.16 kg) not lower than 8 g/10 min., a Flexural Elastic Modulus not lower than 1960 MPa when molded, and an IZOD not lower than 0.088 KJ/m when molded, and a Rockwell hardness (in R scale) not lower than 65 when molded.

20 Claims, 4 Drawing Sheets ized in that polyolefin-based plastic composition con-
POLYOLEFIN-BASED PLASTIC COMPOSITION AND AUTOMOTIVE MOLDED ARTICLE FORMED THEREOF

BACKGROUND OF THE INVENTION

1. Field of the Invention

This invention relates to improvements in polyolefin-based plastic composition reinforced with filler and to an automotive molded article such as a molded pillar member for an automotive vehicle, including an interior finish material for covering a pillar or a side roof rail of the automotive vehicle. More particularly, this invention relates to the polyolefin-based plastic composition and an automotive molded pillar member formed of the plastic composition, the plastic composition improving the molded pillar member in flaw resistance upon application of impact load from a sharp cornered part and article.

2. Description of Related Art

In general, a molded article called a garnish is used at the passenger compartment side of an automotive vehicle (particularly, a passenger car) in order to cover a clearance between a ceiling and a door or a clearance between a front windshield glass and a side door glass. This molded article is mainly intended to decorate the upper part of the passenger compartment and used as a design part for covering the above clearance. An example of the garnish (as an interior finish material) is a pillar garnish which is arranged to cover the passenger compartment side of a front pillar formed between a front windshield glass and a side door glass. The front pillar includes an inner panel and an outer panel which are combined at their flange sections by point welding such as spot welding. The interior finish material or pillar garnish is formed of ABS resin or polypropylene resin and includes a main body section which is integrally provided with an installation section formed at the back side surface thereof The main body section is formed curved to cover the front pillar. The surface of the main body section may be covered with a skin material (not shown) as occasion demands in order to improve design effects. The skin material is a flocked plastic sheet or fabric. The installation section is a clip member which is thrust into a hole or groove in the inner panel of the front pillar, so that the pillar garnish is installed in position. A welt is disposed to cover the clearance between the pillar garnish and the front pillar and a welded section of the inner and outer panels for the purpose of trimming an end section of the pillar garnish at the side which is exposed to the eyes of a vehicle passenger. Additionally, the pillar garnish is provided at its backside surface with reinforcement ribs for the purpose of preventing its opening deformation and providing a stiffness feeling to the pillar garnish.

The pillar garnish is required to have a decorative characteristics, a stiffness feeling and a high quality feeling. Particularly, material of the pillar garnish is required to have a considerable stiffness when installed and upon being heated and to have an excellent moldabiliy which is needed from requirements of design for the pillar garnish. As the material of the pillar garnish, polyolefin-based plastic composition containing filler such as talc has been extensively used to obtain excellent physical properties and moldability.

However, in case that a non-skin pillar garnish is formed of polyolefin-based plastic composition reinforced with filler, the pillar garnish is insufficient in flaw resistance and therefore can be easily flawed and scratched upon collision with a metal part having a sharp corner, such as a tongue of a seat belt. The non-skin pillar garnish is arranged such that, for example, a wrinkle pattern like that of the skin of leather is formed on the surface of the molded article of the plastic composition.

Hitherto, in order to overcome such a defect of the composite material or the polyolefin-based plastic composition containing the filler, the amount of rubber to be blended in the composite material is reduced thereby to increase the stiffness of the molded article or pillar garnish, thus improving the flaw resistance of the pillar garnish. However, with such an improving manner, although the plastic article or pillar garnish exhibits a sufficient flaw resistance against wiping it with a cloth or light interference with the tip end of nail or other automotive parts, a depressed trace is unavoidably left on the surface of the pillar garnish when an impact load is applied from a part having a sharp corner. In fact, under a recent obligation of using a seat belt during driving of the vehicle, a metal part of a buckle and the like of the seat belt will strongly interfere with the pillar garnish when the seat belt is unfasten, increasing problems in which a depressed flaw is left on the surface of the pillar garnish.

In order to overcome such defects of the pillar garnish, it may be proposed that a material (having a high content of rubber) for an automotive bumper is used for the pillar garnish. This improves the flaw resistance of the pillar garnish upon collision of a sharp cornered part or member but lowers the Rockwell hardness and the flexural elastic modulus of the pillar garnish thereby lowering the flaw resistance upon light interference of other part and member and the stiffness of the molded article or pillar garnish. Additionally, a high stiffness material for an automotive bumper has been proposed as disclosed in Japanese Patent Provisional Publication No. 4-56649; however, even the pillar garnish formed of such a material cannot overcome the defect of the Rockwell hardness being insufficient.

SUMMARY OF THE INVENTION

It is an object of the present invention to provide an improved polyolefin-based plastic composition and automotive molded pillar member, which can overcome drawbacks encountered in conventional polyolefin-based plastic compositions and automotive molded pillar members.

Another object of the present invention is to provide an improved polyolefin-based plastic composition suitable for an automotive molded pillar member, which can effectively improve the flaw resistance of the pillar member upon collision of a sharp cornered part or article against the pillar member while maintaining the inherent performance of the pillar member.

A further object of the present invention is to provide an improved automotive molded pillar member formed of a polyolefin-based plastic composition, which is high in flaw resistance upon collision of a sharp cornered part or article with it while effectively maintaining the inherent performance of the pillar member.

As a result of research and development made by inventors to solve the above-discussed problems encountered in the conventional techniques, it has been found that a polyolefin-based plastic composition excellent in impact resistance, flexural elastic modulus and Rockwell hardness can be obtained by blending particular ethylene-1-butene and particular talc at particular blending proportions in particular propylene-ethylene block copolymer. Furthermore, it has been found that, in case of using such a polyolefin-based plastic composition as the material of an automotive molded pillar member such as a pillar garnish, the pillar garnish is largely improved in flaw resistance upon collision of a sharp cornered part or article while maintaining the inherent performance of the pillar garnish. This leads to the present invention.

An aspect of the present invention resides in a polyolefin-based plastic composition comprising: (A) block copolymer in an amount ranging from 53 to 68 parts by weight, the block copolymer having a Melt Flow Rate (at 230° C. and under 2.16 kg) ranging from 20 to 50 g/10 min. and containing crystalline polypropylene section in an amount ranging from 90 to 95% by weight, having a density of not lower than 0.908 g/cm$^3$, and propylene-ethylene random copolymer section in an amount ranging from 5 to 10% by weight, the propylene-ethylene random copolymer section having an ethylene content ranging from 35 to 45% by weight; (B) ethylene-1-butene copolymer rubber in an amount ranging from 12 to 20 parts by weight and having a density ranging from 0.85 to 0.87 g/cm$^3$ and a Melt Flow Rate (at 230° C. and under 2.16 kg) ranging from 0.2 to 5 g/10 min., the copolymer rubber containing 1-butene in an amount ranging from 30 to 40% by weight; and (C) talc in an amount ranging from 22 to 30 parts by weight and having a length not more than 15 μm and an average particle size ranging from 1.5 to 6 μm, the talc having an average aspect ratio not lower than 5; where the polyolefin-based plastic composition having a Melt Flow Rate (at 230° C. and under 2.16 kg) not lower than 8 g/10 min., a Flexural Elastic Modulus not lower than 1960 MPa when molded, and an IZOD not lower than 0.088 KJ/m when molded, and a Rockwell hardness (in R scale) not lower than 65 when molded.

Another aspect of the present invention resides in an automotive molded article having a Flexural Elastic Modulus not lower than 1960 MPa, and an IZOD not lower than 0.088 KJ/m, and a Rockwell hardness (in R scale) not lower than 65. The molded article being formed of a polyolefin-based plastic composition comprising (A) block copolymer in an amount ranging from 53 to 68 parts by weight, the block copolymer having a Melt Flow Rate (at 230° C. and under 2.16 kg) ranging from 20 to 50 g/10 min. and containing crystalline polypropylene section in an amount ranging from 90 to 95% by weight, having a density of not lower than 0.908 g/cm$^3$, and propylene-ethylene random copolymer section in an amount ranging from 5 to 10% by weight, the propylene-ethylene random copolymer section having an ethylene content ranging from 35 to 45% by weight; (B) ethylene-1-butene copolymer rubber in an amount ranging from 12 to 20 parts by weight and having a density ranging from 0.85 to 0.87 g/cm$^3$ and a Melt Flow Rate (at 230° C. and under 2.16 kg) ranging from 0.2 to 5 g/10 min., the copolymer rubber containing 1-butene in an amount ranging from 30 to 40% by weight; and (C) talc in an amount ranging from 22 to 30 parts by weight and having a length not more than 15 μm and an average particle size ranging from 1.5 to 6 μm, the talc having an average aspect ratio not lower than 5.

The polyolefin-based plastic composition of the present invention has a good moldability and provides a high mechanical property balance (for example, stiffness and impact resistance) when molded into an automotive molded article (for example, a pillar garnish). In case of using the polyolefin-based plastic composition as the material of the pillar garnish, the pillar garnish can largely improved in flaw resistance upon collision of a sharp cornered part or article while maintaining the inherent performance of the pillar garnish. Accordingly, the pillar garnish cannot be easily flawed and scratched upon collision with a metal part having a sharp corner, such as a tongue of a seat belt.

DETAILED DESCRIPTION OF THE INVENTION

Figure 1A:
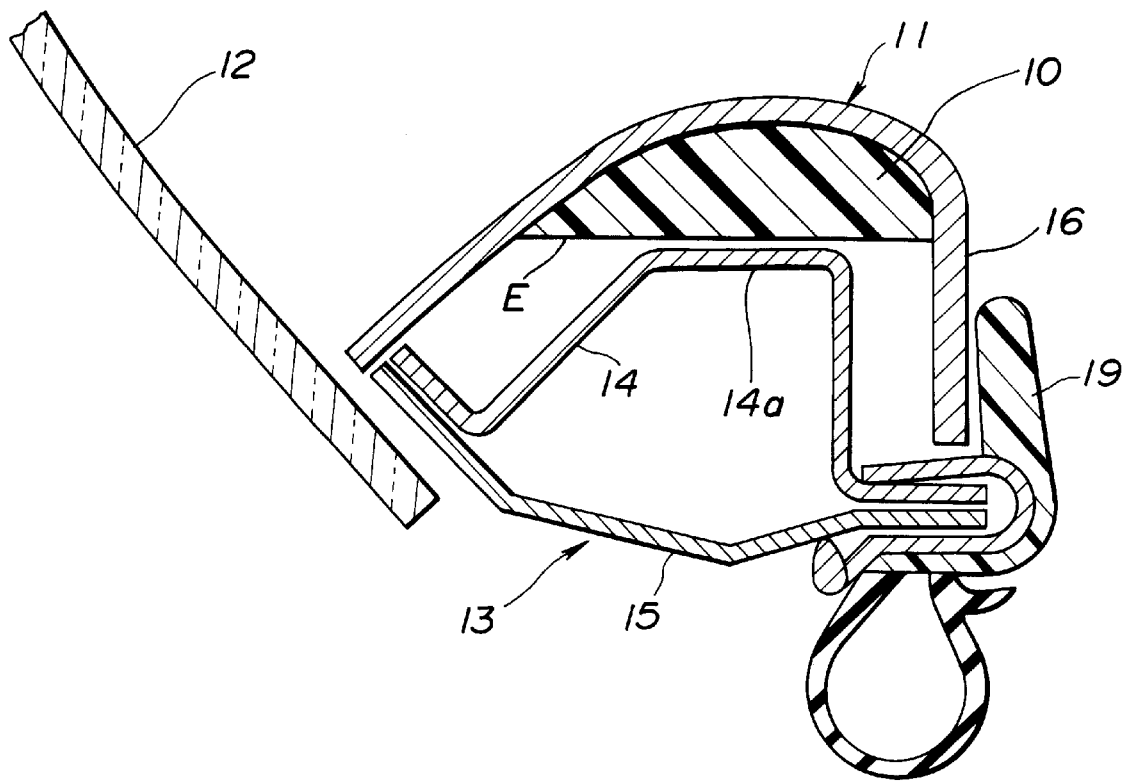
FIG. 1A is a transverse sectional view of an example of a pillar garnish formed of a polyolefin-based plastic composition according to the present invention, in a state to be installed in position.

[I] Invention According to the present invention, a polyolefin-based plastic composition comprises:

propylene-ethylene block copolymer ("Component A") in an amount ranging from 53 to 68 parts by weight, the block copolymer having a Melt Flow Rate (at 230° C. and under 2.16 kg) ranging from 20 to 50 g/10 min. and containing crystalline polypropylene section in an amount ranging from 90 to 95% by weight, having a density of not lower than 0.908 g/cm$^3$, and propylene-ethylene random copolymer section in an amount ranging from 5 to 10% by weight, the propylene-ethylene random copolymer section having an ethylene content ranging from 35 to 45% by weight;

ethylene-1-butene copolymer rubber ("Component B") in an amount ranging from 12 to 20 parts by weight and having a density ranging from 0.85 to 0.87 g/cm$^3$ and a Melt Flow Rate (at 230° C. and under 2.16 kg) ranging from 0.2 to 5 g/10 min., the copolymer rubber containing 1-butene in an amount ranging from 30 to 40% by weight; and talc ("Component C") in an amount ranging from 22 to 30 parts by weight and having a length not more than 15 μm and an average particle size ranging from 1.5 to 6 μm, the talc having an average aspect ratio not lower than 5;

where the polyolefin-based plastic composition having a Melt Flow Rate (at 230° C. and under 2.16 kg) not lower than 8 g/10 min., a Flexural Elastic Modulus not lower than 1960 MPa when molded, and an IZOD not lower than 0.088 KJ/m when molded, and a Rockwell hardness (in R scale) not lower than 65 when molded.

[II] Components

The components of the polyolefin-based plastic composition of the present invention will be discussed in detail.

The Component A (propylene-ethylene block copolymer):

The propylene-ethylene block copolymer to be used in the polyolefin-based plastic composition or thermoplastic resin composition contains 90 to 95% by weight of the crystalline propylene (single) section, and 5 to 10% by weight of the propylene-ethylene random copolymer section which is represented as a component which can be dissolved with o-dichlorobenzene at a temperature not higher than 50° C. for the purpose of separation between the two sections. The Melt Flow Rate of the propylene-ethylene block copolymer is within a range of from 20 to 50 g/10 min., preferably 25 to 45 g/10 min.

If the Melt Flow Rate is lower than 20 g/10 min., the polyolefin-based plastic composition is inferior in moldability. On the contrary, if the Melt Flow Rate exceeds 50 g/10 min., a molded article formed of the composition is inferior in flaw resistance and therefore can be easily flawed and scratched upon collision with a metal part having a sharp corner, such as a tongue of a seat belt. If the content of the propylene-ethylene random copolymer section is less than 5% by weight, the molded article formed of the composition is inferior in flaw resistance and therefore can be easily flawed and scratched upon collision with the metal part having a sharp corner, such as the seat belt tongue. On the contrary, if the content of the propylene-ethylene random copolymer section exceeds 10% by weight, the molded article formed of the composition is low in Flexural Elastic Modulus.

The propylene-ethylene block copolymer (the Component A) can be produced under slurry polymerization, gas phase polymerization or liquid phase bulk polymerization by using a catalyst for high stereoregular polymerization. A concrete example of production of the block copolymer under polymerization is as follows: First, single polymerization of propylene is made by using a catalyst which is prepared by combining an organic aluminum compound component with a solid component which has been produced by contacting titanium tetrachloride, organic halide and organic silicon compound with magnesium chloride. Subsequently, random copolymerization of propylene and ethylene is made.

The propylene-ethylene block copolymer may be a copolymer which contains other unsaturated compound(s), for example, α-olefin such as 1-butene and vinyl ester such as vinyl acetate. Otherwise, the propylene-ethylene block copolymer may be a mixture including such unsaturated compound(s). The amount of the unsaturated compound(s) is within a range where effects of the present invention cannot be degraded. The Melt Flow Rate of the propylene-ethylene block copolymer may be adjusted when the copolymer is polymerized, or after the copolymer is polymerized with organic peroxide such as diacyl peroxide and dialkyl peroxide.

Component B (Ethylene-1-butene copolymer rubber):

The component B to be used in the polyolefin-based plastic composition of the present invention is ethylene-1-butene copolymer rubber. If ethylene-propylene rubber is used in place of ethylene-1-butene copolymer rubber, the molded article formed of the polyolefin-based plastic composition is inferior in flaw resistance and therefore can be easily flawed and scratched upon collision with a metal part having a sharp corner, such as a tongue of a seat belt.

The content of 1-butene in the ethylene-1-butene copolymer rubber (the component B) is within a range of from 30 to 40% by weight, preferably 32 to 38% by weight. The Melt Flow Rate of the component B is within a range of from 0.2 to 5 g/10 min., preferably 0.3 to 4 g/10 min. If the content of 1-butene is less than 30, a molded article formed of the composition is inferior in flaw resistance and therefore can be easily flawed and scratched upon collision with a metal part having a sharp corner, such as a tongue of a seat belt. On the contrary, if the content of 1-butene exceeds 40% by weight, it is difficult to produce the component B. If the Melt Flow Rate is outside the above range, a molded article formed of the composition is inferior in flaw resistance and therefore can be easily flawed and scratched upon collision with a metal part having a sharp corner, such as a tongue of a seat belt.

The ethylene-1-butene copolymer rubber (the component B) may contain a small amount of diene component(s) such as ethylidene norbornene, 1,4-hexadiene, 1,9-decadiene, and/or vinyl norbornene for the purpose of containing a small amount of high polymer component, in which the diene component(s) may be copolymerized with the ethylene-1-butene copolymer rubber.

The ethylene-1-butene copolymer rubber can be produced under polymerization using a so-called Ziegler catalyst such as titanium compound (for example, titanium halogenide), vanadium compound, organic aluminum-magnesium complex (for example, alkylaluminum-magnesium complex, alkylalkoxyaluminum-magnesium complex), alkylaluminum, and/or alkylaluminum chloride), and a metallocene catalyst which is disclosed, for example, in WO-91/04257.

The method of polymerization of the ethylene-1-butene copolymer rubber is suitably selected from known polymerization methods such as gas phase fluid bed process, solution process, slurry process, high pressure ionic polymerization process carried out at a pressure not lower than 200 kg/cm$^2$ and at a temperature not lower than 180° C. The ethylene-1-butene copolymer rubber can be obtained using such a polymerization method in which copolymerization of ethylene and 1-butene is made.

Component C (talc):

The talc to be used in the polyolefin-based plastic composition of the present invention has an average aspect ratio not smaller than 5, preferably not smaller than 5.5. The average aspect ratio is an average value of aspect ratios of talc particles, each aspect ratio is the ratio of one of longitudinal or lateral lengths of a talc particle to the thickness of the talc particle. If the average aspect ratio is smaller than 5, the elastic modulus of the molded article formed of the composition is low. Additionally, particle of the talc has a substantial length not larger than 15 $\mu$m and an average particle size ranging from 1.5 to 6 $\mu$m. It is to be noted that the effects of the present invention can be exhibited higher as the average particle diameter is smaller and as the average aspect ratio is larger. The average particle size of talc is measured by a laser-ray dispersion type particle size distribution measuring device which is available, for example, as a LA-500 type measuring device produced by Horiba Mfg. Co., Ltd. The values of the average particle size in the specification of the present application were measured by the LA-500 type measuring device.

The talc can be prepared, for example, first by pulverizing raw ore of talc by an impact type pulverizer such as a jaw crusher, a hammer crasher, or a micron type crasher, then by finely pulverizing the pulverized talc raw ore with a micron mill or a jet mill type pulverizer, and finally by classifying the finely pulverized talc raw ore in particle size by using a cyclone or a micron separator. The talc raw ore is preferably one from China because it is low in content of metal impurities.

The talc as filler may be subjected to surface treatment with a variety of silane coupling agents, titan coupling agents, higher fatty acids, higher fatty acid amides, and/or surface active agents for the purpose of improving adhesion force of talc to the polypropylene resin component.

Component D (Other components):

The polyolefin-based plastic composition of the present invention may contain suitable additives and/or other components in an amount within a range where the effects of the present invention cannot be degraded or or the purpose of further improving the performance of the polyolefin-based plastic composition of the present invention. Such additives and/or other components are blended with the above-discussed components A, B, C. Examples of the additives and other components are pigments for coloring, antioxidants (phenolic, phosphorous, and sulfuric), antistatic agents, dispersing agents, light-stabilizers, ultraviolet ray absorbing agents (benzotriazole-based, and benzophenone-based), nucleating agents, styrene-based elastomers such as styrene-ethylene-butylene-styrene block copolymer (SEBS) and styrene-ethylene-propylene-styrene block copolymer (SEPS), organic fillers other than talc (for example, calcium carbonate, barium sulfate, glass fiber, glass bead, carbon fiber, clay, silica, alumina, zeolite, potassium titanate wisker).

[III] Plastic composition (1) Blending proportions of components

The blending proportions of the propylene-ethylene block copolymer (Component A), the ethylene-1-butene copolymer rubber (Component B), and talc (Component C) to be blended to prepare the polyolefin-based plastic composition of the present invention are as follows: The propylene-ethylene block copolymer is within a range of from 53 to 68 parts by weight, preferably 55 to 65 parts by weight. The ethylene-1-butene copolymer rubber is within a range of from 12 to 20 parts by weight, preferably 15 to 20 parts by weight. The talc is within a range of from 22 to 30 parts by weight, preferably 23 to 28 parts by weight.

If the blending proportion of the propylene-ethylene block copolymer (Component A) is less than 53 parts by weight, stiffness of the molded article formed of the plastic composition is inferior. Also in case that the same blending proportion exceeds 68 parts by weight, stiffness of the same molded article is inferior. If the blending proportion of the ethylene-1-butene copolymer rubber (Component B) is less than 12 parts by weight, the molded article formed of the plastic composition is inferior in flaw resistance and therefore can be easily flawed and scratched upon collision with a metal part having a sharp corner, such as a tongue of a seat belt. If the same blending proportion exceeds 20 parts by weight, the molded article formed of the plastic composition is inferior in stiffness and lowered in Rockwell hardness so as to tend to be easily flawed and scratched. If the blending proportion of the talc (Component C) is less than 22 parts by weight, the molded article formed of the plastic composition is inferior in improvement effects on stiffness. On the contrary, if the same blending proportion exceeds 30 parts by weight, the molded article formed of the plastic composition is inferior in flaw resistance and therefore can be easily flawed and scratched upon collision with a metal part having a sharp corner, such as a tongue of a seat belt. The plastic composition of the present invention is suitable for the material of a variety of injection-molded articles or automotive vehicle parts, in which it is preferable that the blending proportion of each component A, B, C is adjustable within the above range, in accordance with intended purposes or kinds of the automotive vehicle parts.

(2) Production of plastic composition

The above Components A, B, C in the above respective blending proportions and optionally the above Component D are blended by a mixer, and then kneaded and pelletized by using a kneading machine such as a monoaxial extruder, a biaxial extruder, a Banbury mixer, a roll mixer, a brabender, or a kneader thereby to obtain the pelletized polyolefin-based plastic composition of the present invention. In this production process, it is preferable to finely dispersing the respective Components A, B, C, (D), so that kneading the Components is preferably made by using the biaxial extruder. The kneading and pelletizing operation may be made on the wholly blended Components, or on each of divided parts of the blended Components for the purpose of improving performance of the molded article.

(3) Molding of plastic composition

The plastic composition obtained by the above production process is molded into a variety of articles upon using a variety of molding processes such as injection molding, injection compression molding, compression molding, extrusion molding (for molding a sheet and a film), and a blow molding. Of these molding processes, it is preferable to use injection molding, gas injection molding or injection compression molding.

(4) Shape of molded article

A typical example of the molded article is a pillar garnish or molded pillar member 11 of an automotive vehicle, serving as an automotive interior finish material. The pillar garnish 11 is, for example, installed to cover the interior side surface of a front pillar 13, thereby serving as a front pillar garnish as shown in FIG. 1A. The front pillar 13 is disposed between a front windshield glass 12 and a side door glass (not shown). The front pillar 13 includes an inner panel 14 and an outer panel 15 which are combined, for example, by spot welding which is made at the flange sections of the panels 14, 15. The pillar garnish 11 includes a main body section 16 which extends generally vertical and has a generally C-shaped cross-section. The main body section 16 is fixed to a part (such as the inner panel 14) of the vehicle body of the automotive vehicle. A welt 19 is disposed to cover a clearance between the pillar garnish 11 and the front pillar 13 and a welded section of the inner and outer panels 14, 15.

Figure 1B:
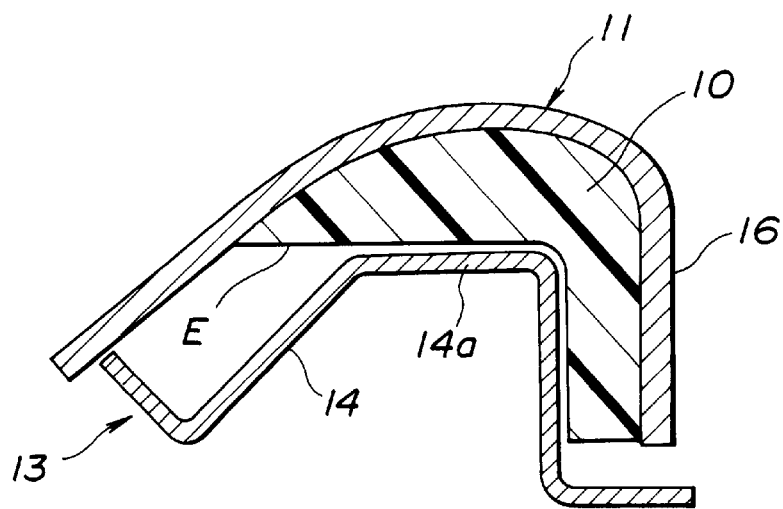
FIG. 1B is a transverse sectional view similar to FIG. 1B but showing another example of the pillar garnish formed of the plastic composition according to the present invention.

A plurality of reinforcement ribs 10 are formed at the inner surface of the main body section 16 which surface faces the front pillar inner panel 14, in a manner to extend from the surface of the main body section 11 toward the front pillar inner panel 14. Each rib 10 has an edge E which extends straight and parallel with an flat section 14a of the front pillar inner panel 14. Each rib 10 is formed between the main body section 16 of the pillar garnish 11 and the inner panel 14 of the front pillar 13 and located to occupy an inboard space relative to the front pillar inner panel 4 in plan or as viewed from the above as shown in FIG. 1A. The inboard space forms part of a space defined between the front pillar inner panel 14 and the pillar garnish 11. The edge E of each rib 10 is close to and slightly spaced from the surface of the flat section 14a of the inner panel 14. Each rib 10 is integral with the main body section 16. The pillar garnish 10 including the main body section 16 and the ribs 10 is molded as a one-piece member. The ribs 10 are located such that the adjacent ribs 10, 10 are separate from each other by a distance (referred to as "rib pitch") ranging from 5 to 50 mm, preferably 5 to 15 mm. If the rib pitch is smaller than 5 mm, releasability of the molded article from a metal mold tends to be degraded. On the contrary, the rib pitch exceeds 50 mm, the molded article is degraded in shape maintaining characteristics under a thermal cycle test (discussed below) and in quality of a combined product which is produced by combining the molded article and other part(s). Each rib 10 is generally plate-shaped and has a thickness ranging from 0.8 to 1.8 mm, preferably 0.9 to 1.7 mm. If the thickness of the rib 10 is smaller than 0.8 mm, the pillar garnish or molded article cannot obtain a sufficient stiffness for maintaining its shape. On the contrary, if the thickness of the rib exceeds 1.8 mm, shrinkage cavity of the molded article becomes prominent thereby deteriorating the external appearance of the molded article. FIG. 1B shows another example of the front pillar garnish 10 similar to that of FIG. 1A except for the shape of each rib 10.

(5) Use of plastic composition and molded article of the present invention

Figure 2:
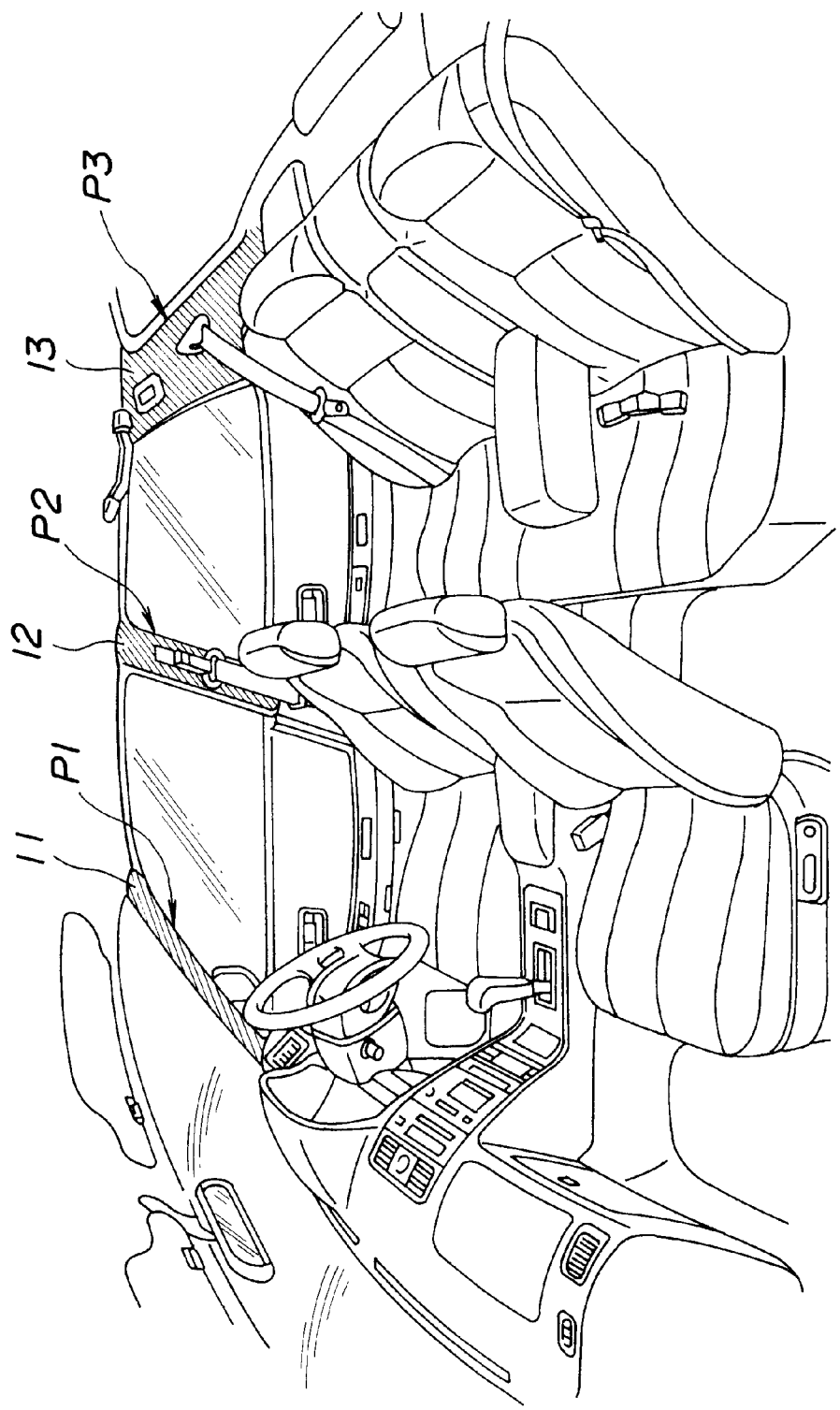
FIG. 2 is a perspective illustration showing a state where pillar garnishes are installed as interior finish materials inside an automotive vehicle.
Figure 3:
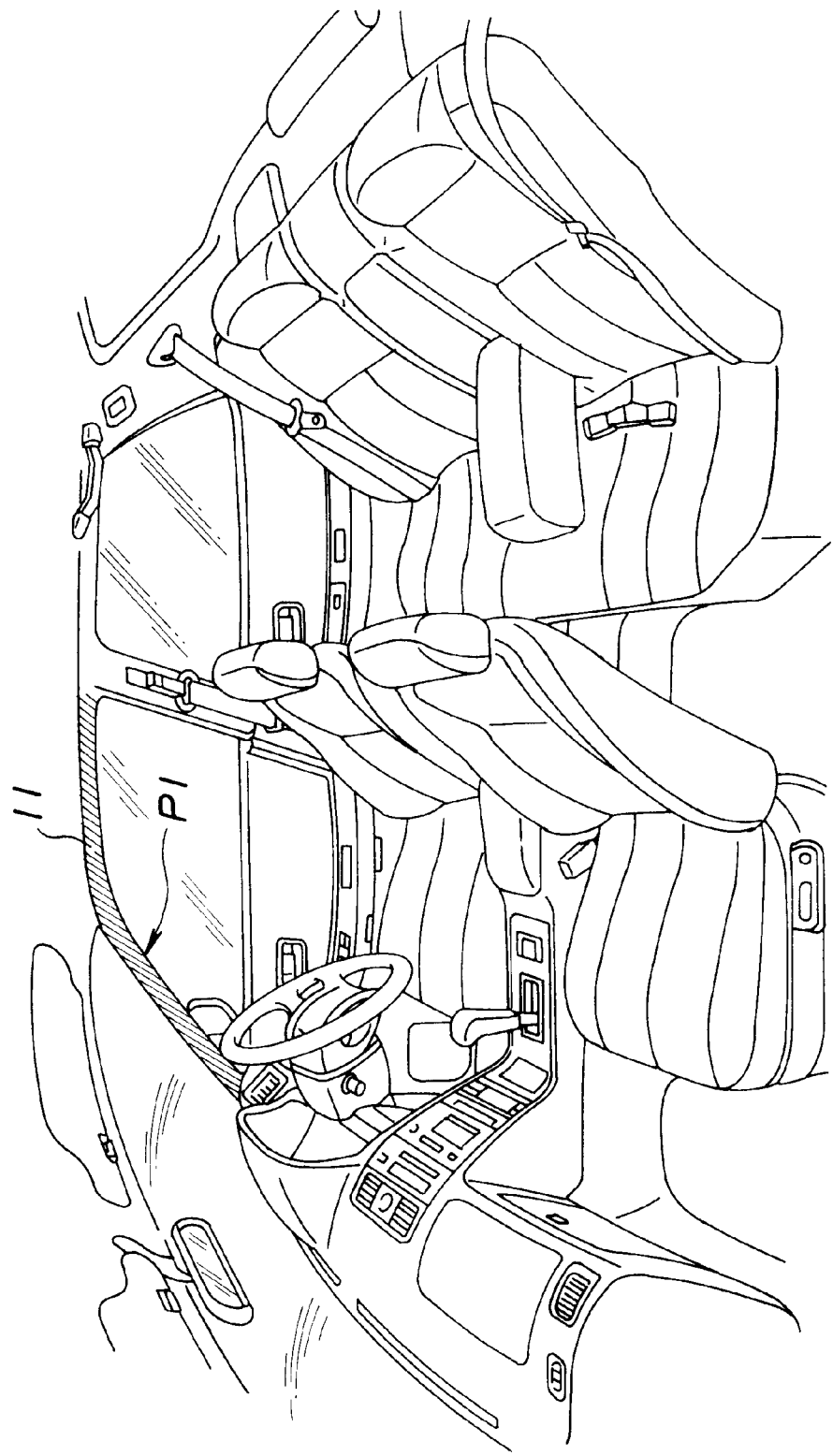
FIG. 3 is a perspective illustration similar to FIG. 2 but showing a state where a further example of the front pillar garnish is installed to extend to the upper part of a door of the automotive vehicle.

The polyolefin-based plastic composition of the present invention has a good moldability and a high mechanical property balance (for example, stiffness and impact resistance) and therefore can be extensively used for a variety of purposes. Typically, the plastic composition of the present invention is used for a variety of automotive vehicle parts, for example, the pillar garnish 11 of a front pillar P1, a pillar garnish 12 of a center pillar P2, and a pillar garnish 13 of a rear pillar P3 as indicated by being shaded in FIG. 2. The pillars P1, P2, P3 form part of an automotive vehicle body. Another example of the pillar garnish 11 of the front pillar P1 is indicated by being shaded in FIG. 3. Additionally, the plastic composition of the present invention is used for a door trim and an instrument panel though not shown. Furthermore, the plastic composition of the present invention can be used for a core material of an interior material which core is covered with a plastic sheet which is flocked at its surface or with a fabric for the purpose of improving design effects. Moreover, it is possible to use the plastic composition of the present invention for an impact energy absorber functioning at so-called secondary collision of the vehicle passenger during vehicle collision or when impact is applied to the vehicle.

(6) Physical properties of plastic composition of the present invention

Melt Flow Rate (MFR):

The Melt Flow Rate of the polyolefin-based plastic composition is not lower than 8 g/10 min. If the Melt Flow Rate is lower than 8 g/10 min., the moldability of the plastic composition is degraded so as to provide a degraded appearance of the molded article. The Melt Flow Rate was measured according to JIS(Japanese Industrial Standard)-K7203 in which the Melt Flow Rate is a flow rate (g/10 min.) of a plastic composition (kept at 230° C.) flowing through a hole (diameter: 2.0955 mm, axial length: 8 mm) formed in a die under a load of 2.16 kg.

Flexural elastic modulus:

The flexural elastic modulus of the molded article formed of the polyolefin-based composition is not lower than 1960 MPa. If the flexural elastic modulus is lower than 1960 MPa, stiffness of the molded article when assembled with other part(s) and stiffness of the molded article under heat are insufficient so that the molded article is insufficient in stiffness feeling and increased in deformation amount under a high temperature. The flexural elastic modulus was measured according to JIS-K7203.

Rockwell hardness:

The Rockwell hardness (in R scale) of the molded article formed of the polyolefin-based composition is not lower than 65. If the Rockwell hardness is lower than 65, the molded article is inferior in flaw resistance and therefore tends to be flawed when it is released from the metal mold and when it is handled in a factory. The Rockwell hardness was measured according to JIS-K6758.

Izod impact value (referred to as "IZOD"):

The Izod impact value of the molded article formed of the polyolefin-base composition is not lower than 0.088 KJ/m. If the Izod impact value is lower than 0.088 KJ/m, the molded article is inferior in flaw resistance and therefore can be easily flawed and scratched upon collision with a metal part having a sharp corner, such as a tongue of a seat belt. In case that the molded article is the pillar garnish, a depressed trace will be formed on the surface of the pillar garnish when an impact load is applied onto the surface of the pillar garnish from the seat belt tongue. The Izod impact value (IZOD) was measured according to JIS-K7110 in which the measurement was made at 0° C. upon forming a notch on a specimen of the plastic composition.

EXAMPLES

The invention will be understood more readily with reference to the following Examples and Comparative Examples; however, these examples are intended to illustrate the invention and are not to be construed to limit the scope of the invention.

Examples 1–15 and Comparative Examples 1–27

Components A, B and C shown respectively in Tables 1, 2 and 3 were blended in the blended proportions shown in Tables 4A to 4F to prepare the compositions shown in Tables 4A and 4F. Additionally, 0.1 part by weight of tetrakis [methylene-3-(3', 5'-di-t-butyl-4'-hydroxyphenyl) propionate] methane and 0.4 part by weight of magnesium stearate as a dispersing agent were blended into 100 parts by weight of total of Components A, B and C (or the compositions shown in Tables 4A to 4F) thereby preparing mixtures. Each of the mixtures was mixed for 5 minutes by a super mixer produced by Kawata Mfg. Co., Ltd. and then kneaded and pelletized at a set temperature of 210° C. by using a biaxial kneading machine or Farrel continuous mixer produced by Kobe Steel, Ltd., thus to obtain a polyolefin-based plastic composition (pellets). The pellets of each composition was subjected to measurement of the Melt Flow Rate discussed before, and the results of the measurement are shown as a part of physical property in Tables 4A to 4F. The pellets of each composition were then molded at a set molding temperature of 220° C. by using an injection molding machine having a clamping pressure (force) of 100 tons thereby to obtain a specimen corresponding to each of Examples 1 to 15 and Comparative Examples 1 to 27.

Each specimen was then subjected to measurement of physical property, and material test shown in Tables 4B and 4E. The physical property included the flexural elastic modulus, Izod impact value (IZOD) and Rockwell hardness in addition to the above Melt Flow Rate. The material test included scratch test and tongue drop test. The scratch test was conducted generally according to JIS-K5400 as follows: A scratch was made on the specimen using a nail jig having a rounded tip end, in place of a pencil in JIS-K5400, upon which a scratch trace formed on the specimen was observed with the naked eye to be evaluated. The result of the evaluation of the scratch test is shown in Tables 4A to 4F, in which "G" indicates a "good" state; and "NG" indicates a "no good" state. The tongue drop test was conducted as follows: A tongue (made of metal) of a seat belt was dropped on the specimen from a height of 1.5 m, upon which a flaw formed on the specimen was observed. The result of the evaluation of the tongue drop test is shown in Tables 4A to 4F, in which "G" indicates a "good" state; and "NG" indicates a "no good" state. The specimens used in the scratch test and the tongue drop test had wrinkles at the surface of the specimen.

Figure 4:
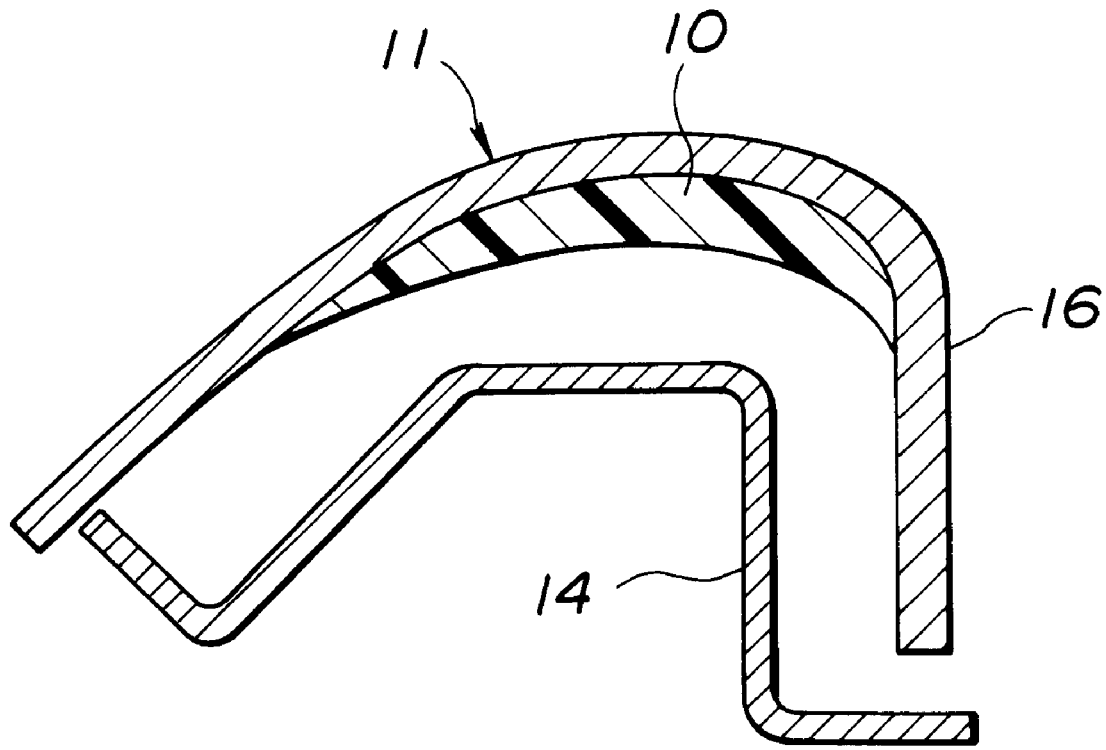
FIG. 4 is a transverse sectional view similar to FIG. 1A but showing a usual example of the pillar garnish formed of the plastic composition.

The pellets of each composition were molded at a molding temperature of 220° C. by using an injection molding machine having a clamping pressure (force) of 350 tons thereby to produce a pillar garnish (product or molded article) shown in FIG. 1A and/or another pillar garnish shown in FIG. 1B. Each pillar garnish included the main body section 11a having a thickness of 2.5 mm and ribs which have a thickness (referred to as "Rib Thickness") of 1.0 mm, 1.7 mm or 2.0 mm and a rib pitch of 20 mm, 50 mm or 80 mm. Additionally, for the comparison purpose, a pillar garnish having ribs as shown in FIG. 4 was also produced under the above molding conditions. Each of the thus produced pillar garnishes were subjected to product test including "surface appearance" test and "thermal cycle" test. The surface appearance test was conducted by observing the external appearance of surface condition of the molded pillar garnish with the naked eye. The thermal cycle test was conducted as follows: First, each of the molded pillar garnishes was subjected to continuous four thermal cycles each having a thermal cycle of from +90° C. to −40° C. After being subjected to the four thermal cycles, observation with the naked eye was made on the pillar garnish to totally evaluate a shape-maintaining characteristics and a quality for combination of the molded pillar garnish with other part(s). The result of the evaluation of the product test is shown in Tables 4A to 4F, in which "G" indicates a "good" state; "PNG" indicates a "partly no good" state; and "NG" indicates a "no good" state.

It will be understood that the plastic compositions of Comparative Examples 25, 26 and 27 were the same as that of Example 1; however, those of Comparative Examples were molded into the pillar garnishes which were different from the molded pillar garnish of Example 1. The plastic composition of Comparative Example 27 was molded into the pillar garnish having a shape shown in FIG. 4.

The test results shown in Tables 4A to 4F demonstrate the following facts: The polyolefin-based plastic compositions of Examples 1 to 15 according to the present invention are excellent in quality balance (including the quality for the combination) and high in flaw resistance while being good in the shape-maintaining characteristics and the quality for combination of the molded pillar garnish with other part(s) after the thermal cycle test. On the contrary, the polyolefin-based plastic compositions of Comparative Examples 1 to 27 outside the scope of the present invention are inferior in quality balance and in flaw resistance, and additionally inferior in the shape-maintaining characteristics and the quality for combination of the molded pillar garnish with other part(s) after the thermal cycle test.

TABLE 1

| | COMPONENT A | | | |
| --- | --- | --- | --- | --- |
| | POLYPROPYLENE (SINGLE) SECTION | | BLOCK COPOLYMER | |
| KIND | DENSITY (g/cm$^3$) | CONTENT (wt %) | MFR (g/10 min) | ETHYLENE (wt %) |
| PP-1 | 0.9097 | 92 | 25 | 3.2 |
| PP-2 | 0.9096 | 93 | 45 | 4.2 |
| PP-3 | 0.9052 | 93 | 27 | 2.8 |
| PP-4 | 0.9098 | 82 | 29 | 7.6 |
| PP-5 | 0.9096 | 91 | 80 | 3 |
| PP-6 | 0.9096 | 91 | 10 | 3.1 |

TABLE 2

| | COMPONENT B | | |
| --- | --- | --- | --- |
| KIND | MFR (g/10 min) | BUTENE CONTENT (wt %) | PROPYLENE CONTENT (wt %) |
| ELASTOMER-1 | 0.8 | 33 | 0 |
| ELASTOMER-2 | 3.2 | 32 | 0 |
| ELASTOMER-3 | 0.9 | 18 | 0 |
| ELASTOMER-4 | 0.7 | 0 | 30 |
| ELASTOMER-5 | 8.1 | 32 | 0 |

TABLE 3

| | COMPONENT C | |
| --- | --- | --- |
| KIND | AVERAGE PARTICLE SIZE (μm) | AVERAGE ASPECT RATIO |
| TALC-1 | 2.8 | 7 |
| TALC-2 | 11.2 | 4 |

TABLE 4A

| | COMPOSITION | | | | | |
| --- | --- | --- | --- | --- | --- | --- |
| | COMPONENT A | | COMPONENT B | | COMPONENT C | |
| SAMPLE | KIND | PARTS BY WEIGHT | KIND | PARTS BY WEIGHT | KIND | PARTS BY WEIGHT |
| EXAMPLE 1 | PP-1 | 58 | ELASTOMER-1 | 17 | TALC-1 | 25 |
| EXAMPLE 2 | | | | | | |
| EXAMPLE 3 | | | | | | |
| EXAMPLE 4 | PP-1 | 60 | ELASTOMER-1 | 15 | TALC-1 | 25 |
| EXAMPLE 5 | | | | | | |
| EXAMPLE 6 | PP-1 | 55 | ELASTOMER-1 | 20 | TALC-1 | 25 |
| EXAMPLE 7 | | | | | | |
| EXAMPLE 8 | PP-1 | 60 | ELASTOMER-1 | 17 | TALC-1 | 23 |
| EXAMPLE 9 | | | | | | |
| EXAMPLE 10 | PP-1 | 53 | ELASTOMER-1 | 17 | TALC-1 | 30 |
| EXAMPLE 11 | | | | | | |
| EXAMPLE 12 | PP-2 | 58 | ELASTOMER-1 | 17 | TALC-1 | 25 |
| EXAMPLE 13 | | | | | | |
| EXAMPLE 14 | PP-1 | 58 | ELASTOMER-2 | 17 | TALC-1 | 25 |
| EXAMPLE 15 | | | | | | |

TABLE 4A-continued

| | COMPOSITION | | | | | |
|---|---|---|---|---|---|---|
| | COMPONENT A | | COMPONENT B | | COMPONENT C | |
| SAMPLE | KIND | PARTS BY WEIGHT | KIND | PARTS BY WEIGHT | KIND | PARTS BY WEIGHT |
| COMPARATIVE EXAMPLE 1 | PP-1 | 50 | ELASTOMER-1 | 25 | TALC-1 | 25 |
| COMPARATIVE EXAMPLE 2 | | | | | | |
| COMPARATIVE EXAMPLE 3 | PP-1 | 65 | ELASTOMER-1 | 10 | TALC-1 | 25 |
| COMPARATIVE EXAMPLE 4 | | | | | | |
| COMPARATIVE EXAMPLE 5 | PP-1 | 52 | ELASTOMER-1 | 15 | TALC-1 | 33 |
| COMPARATIVE EXAMPLE 6 | | | | | | |

TABLE 4B

| | PHYSICAL PROPERTY | | | | MATERIAL TEST FLAW TEST | |
|---|---|---|---|---|---|---|
| | | FREX. ELASTIC | | ROCKWELL | | |
| SAMPLE | MFR g/10 min | MODU. kg/cm$^2$ | IZOD kg·cm/cm$^2$ | HARDNESS (R SCALE) | SCRATCH TEST | TONGUE DROP TEST |
| EXAMPLE 1 | 11 | 26000 | 18 | 71 | G | G |
| EXAMPLE 2 | | | | | | |
| EXAMPLE 3 | | | | | | |
| EXAMPLE 4 | 13 | 27500 | 10 | 74 | G | G |
| EXAMPLE 5 | | | | | | |
| EXAMPLE 6 | 10 | 24500 | 35 | 67 | G | G |
| EXAMPLE 7 | | | | | | |
| EXAMPLE 8 | 12 | 25000 | 19 | 74 | G | G |
| EXAMPLE 9 | | | | | | |
| EXAMPLE 10 | 10 | 29000 | 10 | 73 | G | G |
| EXAMPLE 11 | | | | | | |
| EXAMPLE 12 | 18 | 26500 | 12 | 69 | G | G |
| EXAMPLE 13 | | | | | | |
| EXAMPLE 14 | 17 | 25100 | 13 | 70 | G | G |
| EXAMPLE 15 | | | | | | |
| COMPARATIVE EXAMPLE 1 | 8 | 21500 | 53 | 57 | NG | G |
| COMPARATIVE EXAMPLE 2 | | | | | | |
| COMPARATIVE EXAMPLE 3 | 16 | 30100 | 4 | 87 | G | NG |
| COMPARATIVE EXAMPLE 4 | | | | | | |
| COMPARATIVE EXAMPLE 5 | 13 | 31000 | 6 | 74 | G | NG |
| COMPARATIVE EXAMPLE 6 | | | | | | |

TABLE 4C

| | PRODUCT TEST | | | | |
|---|---|---|---|---|---|
| | SURFACE APPEARANCE | | THERMAL CYCLE | | |
| SAMPLE | THICKNESS | | SHAPE | RIB PITCH | |
| EXAMPLE 1 | 1.7 mm | G | FIG. 1A | 20 mm | G |
| EXAMPLE 2 | 1.7 mm | G | FIG. 1A | 50 mm | G |
| EXAMPLE 3 | 1.0 mm | G | FIG. 1A | 20 mm | G |
| EXAMPLE 4 | 1.7 mm | G | FIG. 1A | 20 mm | G |
| EXAMPLE 5 | 1.0 mm | G | FIG. 1A | 20 mm | G |
| EXAMPLE 6 | 1.7 mm | G | FIG. 1B | 20 mm | G |
| EXAMPLE 7 | 1.0 mm | G | FIG. 1A | 20 mm | G |
| EXAMPLE 8 | 1.7 mm | G | FIG. 1A | 20 mm | G |
| EXAMPLE 9 | 1.0 mm | G | FIG. 1A | 20 mm | G |
| EXAMPLE 10 | 1.7 mm | G | FIG. 1B | 20 mm | G |
| EXAMPLE 11 | 1.0 mm | G | FIG. 1A | 20 mm | G |
| EXAMPLE 12 | 1.7 mm | G | FIG. 1A | 20 mm | G |
| EXAMPLE 13 | 1.0 mm | G | FIG. 1A | 20 mm | G |
| EXAMPLE 14 | 1.7 mm | G | FIG. 1B | 20 mm | G |
| EXAMPLE 15 | 1.0 mm | G | FIG. 1A | 20 mm | G |
| COMPARATIVE EXAMPLE 1 | 1.7 mm | G | FIG. 1A | 20 mm | G |
| COMPARATIVE EXAMPLE 2 | 1.0 mm | G | FIG. 1A | 20 mm | G |
| COMPARATIVE EXAMPLE 3 | 1.7 mm | PNG | FIG. 1A | 20 mm | G |
| COMPARATIVE EXAMPLE 4 | 1.0 mm | G | FIG. 1A | 20 mm | G |
| COMPARATIVE EXAMPLE 5 | 1.7 mm | G | FIG. 1A | 20 mm | G |
| COMPARATIVE EXAMPLE 6 | 1.0 mm | G | FIG. 1A | 20 mm | G |

TABLE 4D

| | COMPOSITION | | | | | |
|---|---|---|---|---|---|---|
| | COMPONENT A | | COMPONENT B | | COMPONENT C | |
| SAMPLE | KIND | PARTS BY WEIGHT | KIND | PARTS BY WEIGHT | KIND | PARTS BY WEIGHT |
| COMPARATIVE EXAMPLE 7 | PP-1 | 70 | ELASTOMER-1 | 20 | TALC-1 | 10 |
| COMPARATIVE EXAMPLE 8 | | | | | | |
| COMPARATIVE EXAMPLE 9 | PP | 63 | ELASTOMER-1 | 17 | TALC-1 | 20 |
| COMPARATIVE EXAMPLE 10 | | | | | | |
| COMPARATIVE EXAMPLE 11 | PP-1 | 60 | ELASTOMER-3 | 15 | TALC-1 | 25 |
| COMPARATIVE EXAMPLE 12 | | | | | | |
| COMPARATIVE EXAMPLE 13 | PP-1 | 60 | ELASTOMER-4 | 15 | TALC-1 | 25 |
| COMPARATIVE EXAMPLE 14 | | | | | | |
| COMPARATIVE EXAMPLE 15 | PP-1 | 63 | ELASTOMER-1 | 17 | TALC-2 | 20 |
| COMPARATIVE EXAMPLE 16 | | | | | | |
| COMPARATIVE EXAMPLE 17 | PP-4 | 63 | ELASTOMER-1 | 17 | TALC-1 | 20 |
| COMPARATIVE EXAMPLE 18 | | | | | | |
| COMPARATIVE EXAMPLE 19 | PP-5 | 60 | ELASTOMER-1 | 15 | TALC-1 | 25 |
| COMPARATIVE EXAMPLE 20 | | | | | | |
| COMPARATIVE EXAMPLE 21 | PP-6 | 58 | ELASTOMER-1 | 17 | TALC-1 | 25 |
| COMPARATIVE EXAMPLE 22 | | | | | | |
| COMPARATIVE EXAMPLE 23 | PP-1 | 60 | ELASTOMER-5 | 15 | TALC-1 | 25 |
| COMPARATIVE EXAMPLE 24 | | | | | | |
| COMPARATIVE EXAMPLE 25 | PP-1 | 58 | ELASTOMER-1 | 17 | TALC-1 | 25 |
| COMPARATIVE EXAMPLE 26 | | | | | | |
| COMPARATIVE EXAMPLE 27 | | | | | | |

TABLE 4E

| | PHYSICAL PROPERTY | | | | | |
|---|---|---|---|---|---|---|
| | | FREX. ELASTIC | | ROCKWELL | MATERIAL TEST FLAW TEST | |
| SAMPLE | MFR g/10 min | MODU. kg/cm$^2$ | IZOD kg·cm/cm$^2$ | HARDNESS (R SCALE) | SCRATCH TEST | TONGUE DROP TEST |
| COMPARATIVE EXAMPLE 7 | 12 | 16500 | 47 | 71 | NG | G |
| COMPARATIVE EXAMPLE 8 | | | | | | |
| COMPARATIVE EXAMPLE 9 | 14 | 19500 | 25 | 68 | NG | G |
| COMPARATIVE EXAMPLE 10 | | | | | | |
| COMPARATIVE EXAMPLE 11 | 13 | 28000 | 7 | 79 | G | NG |
| COMPARATIVE EXAMPLE 12 | | | | | | |
| COMPARATIVE EXAMPLE 13 | 11 | 27100 | 7 | 76 | G | NG |
| COMPARATIVE EXAMPLE 14 | | | | | | |
| COMPARATIVE EXAMPLE 15 | 12 | 19500 | 19 | 75 | NG | G |
| COMPARATIVE EXAMPLE 16 | | | | | | |
| COMPARATIVE EXAMPLE 17 | 14 | 19000 | 58 | 67 | NG | G |
| COMPARATIVE EXAMPLE 18 | | | | | | |
| COMPARATIVE EXAMPLE 19 | 30 | 28000 | 5 | 75 | G | NG |
| COMPARATIVE EXAMPLE 20 | | | | | | |
| COMPARATIVE EXAMPLE 21 | 5 | 25300 | 28 | 70 | NG | G |
| COMPARATIVE EXAMPLE 22 | | | | | | |
| COMPARATIVE EXAMPLE 23 | 18 | 27100 | 6 | 73 | G | NG |
| COMPARATIVE EXAMPLE 24 | | | | | | |
| COMPARATIVE EXAMPLE 25 | 11 | 26000 | 18 | 71 | G | G |
| COMPARATIVE EXAMPLE 26 | | | | | | |
| COMPARATIVE EXAMPLE 27 | | | | | | |

TABLE 4F

| | PRODUCT TEST | | | | |
|---|---|---|---|---|---|
| | SURFACE APPEARANCE | THERMAL CYCLE | | | |
| SAMPLE | THICKNESS | | SHAPE | RIB PITCH | |
| COMPARATIVE EXAMPLE 7 | 1.7 mm | G | FIG. 1B | 20 mm | PNG |
| COMPARATIVE EXAMPLE 8 | 1.0 mm | G | FIG. 1B | 20 mm | NG |
| COMPARATIVE EXAMPLE 9 | 1.7 mm | G | FIG. 1A | 20 mm | G |
| COMPARATIVE EXAMPLE 10 | 1.0 mm | G | FIG. 1A | 20 mm | PNG |
| COMPARATIVE EXAMPLE 11 | 1.7 mm | G | FIG. 1B | 20 mm | G |
| COMPARATIVE EXAMPLE 12 | 1.0 mm | G | FIG. 1A | 20 mm | G |
| COMPARATIVE EXAMPLE 13 | 1.7 mm | G | FIG. 1A | 20 mm | G |
| COMPARATIVE EXAMPLE 14 | 1.0 mm | G | FIG. 1A | 20 mm | G |
| COMPARATIVE EXAMPLE 15 | 1.7 mm | G | FIG. 1B | 20 mm | G |
| COMPARATIVE EXAMPLE 16 | 1.0 mm | G | FIG. 1B | 20 mm | PNG |
| COMPARATIVE EXAMPLE 17 | 1.7 mm | G | FIG. 1A | 20 mm | G |
| COMPARATIVE EXAMPLE 18 | 1.0 mm | G | FIG. 1A | 20 mm | PNG |
| COMPARATIVE EXAMPLE 19 | 1.7 mm | G | FIG. 1A | 20 mm | G |
| COMPARATIVE EXAMPLE 20 | 1.0 mm | G | FIG. 1A | 20 mm | G |
| COMPARATIVE EXAMPLE 21 | 1.7 mm | G | FIG. 1A | 20 mm | G |
| COMPARATIVE EXAMPLE 22 | 1.0 mm | G | FIG. 1A | 20 mm | G |
| COMPARATIVE EXAMPLE 23 | 1.7 mm | G | FIG. 1A | 20 mm | G |
| COMPARATIVE EXAMPLE 24 | 1.0 mm | G | FIG. 1A | 20 mm | G |
| COMPARATIVE EXAMPLE 25 | 2.0 mm | NG | FIG. 1A | 20 mm | G |
| COMPARATIVE EXAMPLE 26 | 1.0 mm | G | FIG. 1A | 80 mm | NG |
| COMPARATIVE EXAMPLE 27 | 1.0 mm | G | FIG. 4 | 50 mm | NG |

What is claimed is:

1. A polyolefin-based plastic composition comprising:
   (A) block copolymer in an amount ranging from 53 to 68 parts by weight, said block copolymer having a Melt Flow Rate (at 230° C. and under 2.16 kg) ranging from 20 to 50 g/10 min. and containing crystalline polypropylene section in an amount ranging from 90 to 95% by weight, having a density of not lower than 0.908 g/cm$^3$, and propylene-ethylene random copolymer section in an amount ranging from 5 to 10% by weight, said propylene-ethylene random copolymer section having an ethylene content ranging from 35 to 45% by weight;
   (B) ethylene-1-butene copolymer rubber in an amount ranging from 12 to 20 parts by weight and having a density ranging from 0.85 to 0.87 g/cm$^3$ and a Melt Flow Rate (at 230° C. and under 2.16 kg) ranging from 0.2 to 5 g/10 min., said copolymer rubber containing 1-butene in an amount ranging from 30 to 40% by weight; and
   (C) talc in an amount ranging from 22 to 30 parts by weight and having a length not more than 15 μm and an average particle size ranging from 1.5 to 6 μm, said talc having an average aspect ratio not lower than 5;

where said polyolefin-based plastic composition has a Melt Flow Rate (at 230° C. and under 2.16 kg) not lower than 8 g/10 min., a Flexural Elastic Modulus not lower than 1960 MPa when molded, and an IZOD not lower than 0.088 KJ/m when molded, and a Rockwell hardness (in R scale) not lower than 65 when molded.

2. An automotive molded article having a Flexural Elastic Modulus not lower than 1960 MPa, and an IZOD not lower than 0.088 KJ/m, and a Rockwell hardness (in R scale) not lower than 65, said molded article being formed of a polyolefin-based plastic composition comprising:
   (A) block copolymer in an amount ranging from 53 to 68 parts by weight, said block copolymer having a Melt Flow Rate (at 230° C. and under 2.16 kg) ranging from 20 to 50 g/10 min. and containing crystalline polypropylene section in an amount ranging from 90 to 95% by weight, having a density of not lower than 0.908 g/cm$^3$, and propylene-ethylene random copolymer section in an amount ranging from 5 to 10% by weight, said propylene-ethylene random copolymer section having an ethylene content ranging from 35 to 45% by weight;
   (B) ethylene-1-butene copolymer rubber in an amount ranging from 12 to 20 parts by weight and having a density ranging from 0.85 to 0.87 g/cm$^3$ and a Melt Flow Rate (at 230° C. and under 2.16 kg) ranging from 0.2 to 5 g/10 min., said copolymer rubber containing 1-butene in an amount ranging from 30 to 40% by weight; and
   (C) talc in an amount ranging from 22 to 30 parts by weight and having a length not more than 15 μm and an average particle size ranging from 1.5 to 6 μm, said talc having an average aspect ratio not lower than 5.

3. An automotive molded article as claimed in claim 2, wherein said molded article is an automotive pillar member including a main body section adapted to cover a pillar forming part of an automotive vehicle body, and a plurality of reinforcement ribs integral with said main body section and located between said main body section and the pillar, each rib having an end edge which faces and is parallel with a surface of the pillar, the end edge of said rib being close to and slightly separate from the surface of the pillar.

4. An automotive molded article as claimed in claim 3, wherein
   said reinforcement ribs are arranged such that a distance between adjacent reinforcement ribs is within a range of from 5 to 50 mm, each reinforcement rib having a thickness ranging from 0.8 to 1.8 mm.

5. An automotive molded article as claimed in claim 3, wherein said pillar member is a pillar garnish for covering one of front, center and rear pillars forming part of the automotive vehicle body.

6. A polyolefin-based plastic composition as claimed in claim 1, wherein the ethylene-1-butene copolymer rubber component (B) contains from 32 to 38% by weight of 1-butene.

7. An automotive molded article as claimed in claim 2, wherein the ethylene-1-butene copolymer rubber component (B) contains from 32 to 38% by weight of 1-butene.

8. A polyolefin-based plastic composition as claimed in claim 1, wherein the Melt Flow Rate of the ethylene-1-butene copolymer rubber ranges from 0.3 to 4 g/10 min.

9. An automotive molded article as claimed in claim 2, wherein the Melt Flow Rate of the ethylene-1-butene copolymer rubber ranges from 0.3 to 4 g/10 min.

10. A polyolefin-based plastic composition as claimed in claim 1, wherein the composition further comprises one or more additional components selected from the group consisting of pigments, antioxidants, antistatic agents, dispersing agents, light-stabilizers, ultraviolet ray absorbing agents, nucleating agents, styrene-ethylene-butylene-styrene block copolymers, styrene-ethylene-propylene-styrene block copolymers, calcium carbonate, barium sulfate, glass fibers, glass beads, carbon fibers, clay, silica, alumina, zeolite, potassium titanate wiskers, and mixtures thereof.

11. An automotive molded article as claimed in claim 2, further comprising one or more additional components selected from the group consisting of pigments, antioxidants, antistatic agents, dispersing agents, light-stabilizers, ultraviolet ray absorbing agents, nucleating agents, styrene-ethylene-butylene-styrene block copolymers, styrene-ethylene-propylene-styrene block copolymers, calcium carbonate, barium sulfate, glass fibers, glass beads, carbon fibers, clay, silica, alumina, zeolite, potassium titanate wiskers, and mixtures thereof.

12. A polyolefin-based plastic composition consisting essentially of:
  (A) a block copolymer in an amount ranging from 53 to 68 parts by weight, said block copolymer having a Melt Flow Rate (at 230° C. and under 2.16 Kg) ranging from 20 to 50 g/10 min, and containing a crystalline polypropylene section (I) in an amount ranging from 90 to 95% by weight, having a density of not lower than 0.902 g/cm$^3$, and a propylene-ethylene random copolymer section (II) in an amount ranging from 5 to 10% by weight, said propylene-ethylene random copolymer section (II) having an ethylene content ranging from 35 to 45% by weight;
  (B) ethylene-1-butene copolymer rubber in an amount ranging from 12 to 20 parts by weight and having a density ranging from 0.85 to 0.87 g/cm$^3$ and a Melt Flow Rate (at 230° C. and under 2.16 kg) ranging from 0.2 to 5 g/10 min., said copolymer rubber containing 1-butene in an amount ranging from 30 to 40% by weight; and
  (C) talc in an amount ranging from 22 to 30 parts by weight and having a length not more than 15 μm and an average particle size ranging from 1.5 to 6 μm, said talc having an average aspect ratio not lower than 5;
  where said polyolefin-based plastic composition has a Melt Flow Rate (at 230° C. and under 2.16 kg) not lower than 8 g/10 min, a Flexural Elastic Modulus not lower than 1960 MPa when molded, an IZOD not lower than 0.088 KJ/m when molded, and a Rockwell hardness (in R scale) not lower than 65 when molded.

13. A polyolefin-based plastic composition as claimed in claim 12, wherein the ethylene-1-butene copolymer rubber component (B) contains from 32 to 38% by weight of 1-butene.

14. A polyolefin-based plastic composition as claimed in claim 12, wherein the Melt Flow Rate of the ethylene-1-butene copolymer rubber ranges from 0.3 to 4 g/10 min.

15. A polyolefin-based plastic composition as claimed in claim 12, wherein the composition further comprises one or more additional components selected from the group consisting of pigments, antioxidants, antistatic agents, dispersing agents, light-stabilizers, ultraviolet ray absorbing agents, nucleating agents, styrene-ethylene-butylene-styrene block copolymers, styrene-ethylene-propylene-styrene block copolymers, calcium carbonate, barium sulfate, glass fibers, glass beads, carbon fibers, clay, silica, alumina, zeolite, potassium titanate wiskers, and mixtures thereof.

16. An automotive molded article being formed of a polyolefin-based plastic composition as claimed in claim 12.

17. An automotive molded article as claimed in claim 16, wherein said molded article is an automotive pillar member including a main body section adapted to cover a pillar forming part of an automotive vehicle body, and a plurality of reinforcement ribs integral with said main body section and located between said main body section and the pillar, each rib having an end edge which faces and is parallel with a surface of the pillar, the end edge of said rib being close to and slightly separate from the surface of the pillar.

18. An automotive molded article as claimed in claim 17, wherein the reinforcement ribs are arranged such that a distance between adjacent reinforcement ribs is within a range of from 5 to 50 mm, each reinforcement rib having a thickness ranging from 0.8 to 1.8 mm.

19. An automotive molded article as claimed in claim 17, wherein said pillar member is a pillar garnish for covering one of front, center and rear pillars forming part of the automotive vehicle body.

20. An automotive molded article as claimed in claim 16, wherein the ethylene-1-butene copolymer rubber component (B) contains from 32 to 38% by weight of 1-butene.

* * * * *